March 2, 1965  J. SCHAEFER  3,171,967
PHASE CURRENT BALANCING FOR MULTIPHASE RECTIFIER CIRCUITS
Filed Oct. 3, 1960  3 Sheets-Sheet 1

INVENTOR.
JOHANNES SCHAEFER
BY
OSTROLENK, FABER, GERB & SOFFEN

ATTORNEYS

March 2, 1965  J. SCHAEFER  3,171,967
PHASE CURRENT BALANCING FOR MULTIPHASE RECTIFIER CIRCUITS
Filed Oct. 3, 1960  3 Sheets-Sheet 2

INVENTOR.
JOHANNES SCHAEFER
BY
OSTROLENK, FABER, GERB & SOFFEN
ATTORNEYS

United States Patent Office 3,171,967
Patented Mar. 2, 1965

3,171,967
PHASE CURRENT BALANCING FOR MULTI-PHASE RECTIFIER CIRCUITS
Johannes Schaefer, Philadelphia, Pa., assignor to I-T-E Circuit Breaker Company, Philadelphia, Pa., a corporation of Pennsylvania
Filed Oct. 3, 1960, Ser. No. 60,186
6 Claims. (Cl. 307—14)

This invention relates to a novel control circuit for balancing the phase currents between the various phases of multiphase rectifier systems.

Because of manufacturing tolerances, particularly for very large current rating rectifiers, it is extremely difficult and expensive to have each phase of a rectifier system have the same reactance as the other phases. These differences occur, for example, because of different reactances in unsymmetrically arranged transformer coils of a rectifier transformer, in the bus bars between the A.-C. and D.-C. systems, as well as within the rectifier proper.

Once there is a given unbalance between the phases, the total unbalance will increase with an increase in current through the rectifier. At the present time there are several methods used to correct this substantially inherent unbalance between phase currents. For example, there have been attempts to use regulating transformers in the A.-C. circuit. This has not proven too successful generally because a continuous voltage control is not available with regulating transformers, and in some cases to achieve proper current balance an extremely fine control of input A.-C. voltage is required.

Other attempts, shown in copending application Serial Number 726,214, filed April 3, 1958, now Patent No. 3,042,849, in the name of I. K. Dortort, assigned to the assignee of the present invention is to provide reactors for each phase of variable iron cross-section. This system, while quite effective, requires shut down of the system and trial and error restacking of the reactor coil. It will be seen that the device of the present invention is adjustable under load. In this solution, however, the transformers become extremely expensive, and are quite large, since they must carry the full power to be added to the circuit.

The essence of the present invention is to provide a magnetic core in each phase wherein the flux level of the core has a controllable number of volt seconds which must be supplied by the phase prior to the time that the phase is to conduct. Thus, in rectifier circuits where a given phase will have a certain interval during which no current will be conducted, a core is provided with a bias such that a predetermined number of volt seconds are reversed during a preceding current carrying interval before the current goes to zero. The remaining volt seconds must then be reversed prior to initiation of conduction of that phase for its next current carrying interval so that there will be a delay in the initiation of conduction of the phase. This delay, which is controllable in magnitude by controlling the amount of volt seconds remaining to be reversed in the core, can be changed for each phase individually so that the net average current passed by each phase is adjustable for an infinitely small number of steps.

In a preferred embodiment of the invention, the bias for the core is derived from the phase current of an adjacent phase whereby an automatic correction is caused so that there will be a constant balance after an initial adjustment regardless of the current passed by the phase in question.

These control circuits will be seen to require very little control power which is essentially negligible as compared to the power being utilized by the rectifier load, and are extremely simple and economical in construction.

Furthermore, since the control circuit power can be derived from the main circuit, it is made independent of the voltage of the circuit and proportional to the current, since the unbalance varies with the current being carried.

Accordingly, a primary object of this invention is to provide a novel control circuit for controlling the phase currents of a multiphase rectifier system.

Another object of this invention is to balance the current between the various phases of a multiphase rectifier system by using a small magnetic core for at least some of the phases which is controlled to cause more or less phase shift of the point at which the phase begins to conduct current.

A further object of this invention is to provide a novel phase current control system for rectifiers wherein the amount of correction provided is a function of the rectifier current and is independent of the rectifier voltage.

These and other objects of this invention will become apparent from the following description when taken in connection with the drawings in which:

FIGURE 1 schematically illustrates a three-phase bridge connected rectifier system which is provided with my novel phase current balancing circuit.

Figure 5:
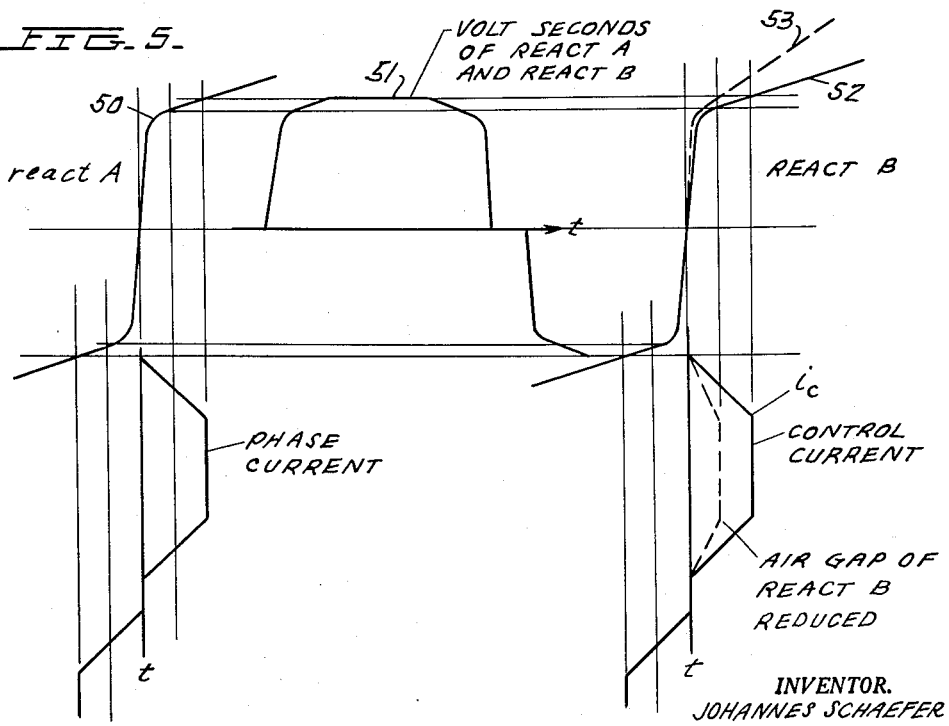

FIGURE 5 graphically represents the manner in which the control current is caused to be a direct function of phase current, notwithstanding inaccuracies in the reactors of the control circuit.

Figure 1:
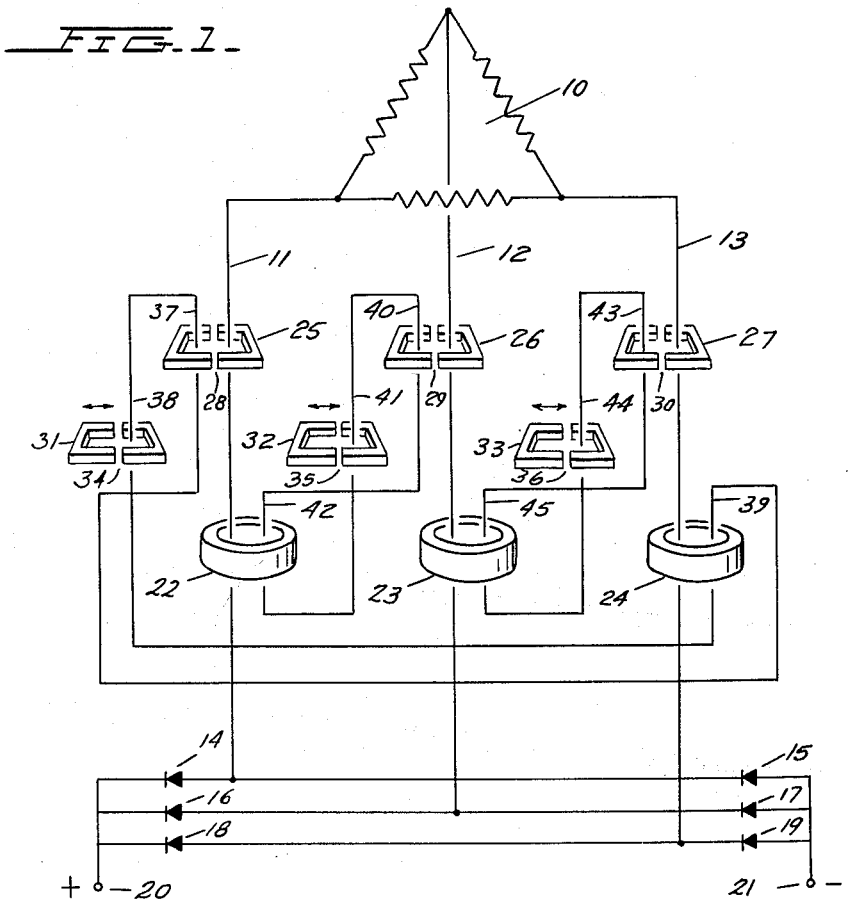
Figure 6:
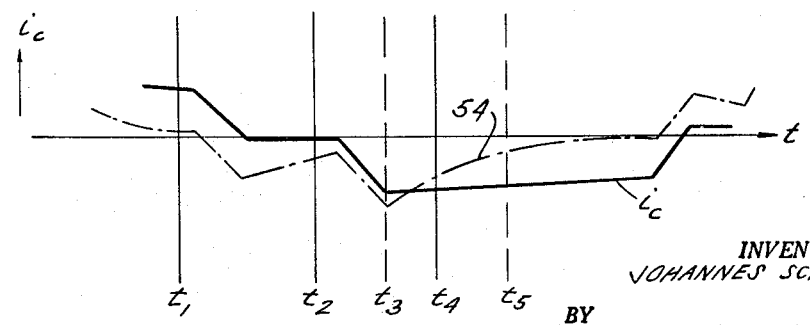
Figure 2:
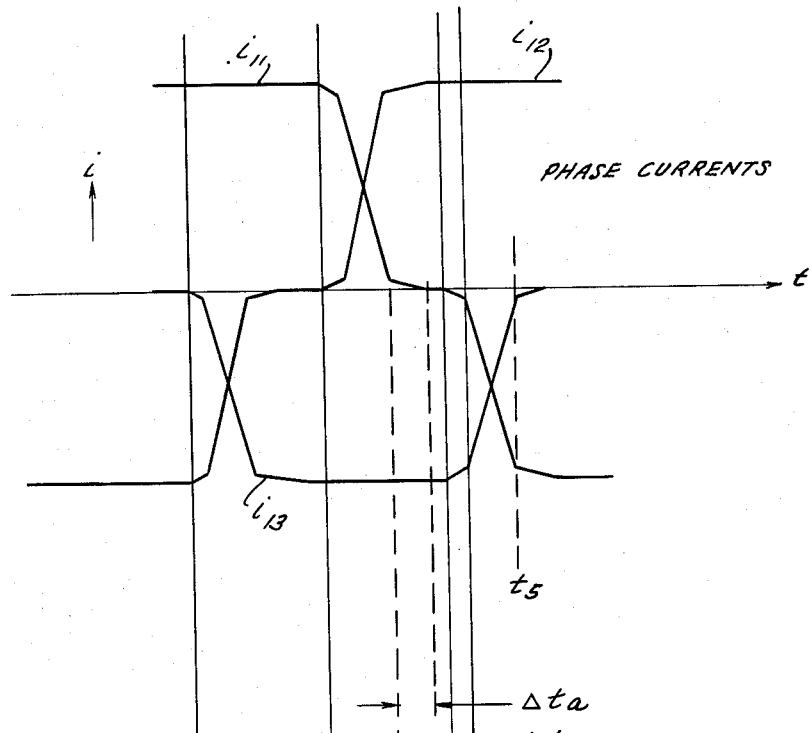
FIGURE 2 illustrates the phase current for each of the three phases of FIGURE 1 as a function of time.
Figure 3:
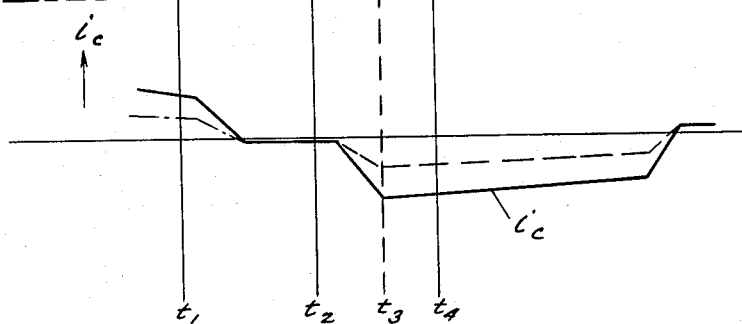
FIGURE 3 illustrates the control current for the control core of FIGURE 1 when plotted on the same time scale as used for FIGURE 2.

FIGURE 6 illustrates the control current as a function of time plotted to the same scale as are FIGURES 2 and 3 for the case of a variable resistor and a reactor in the control circuit rather than a reactor alone, as shown in FIGURE 1.

Referring now to FIGURE 1, I have shown a typical three-phase bridge connected rectifier wherein a power transformer secondary winding 10 is energized from a primary circuit (not shown) and has its secondary conductors 11, 12 and 13 extending to the rectifier bridge. More specifically, the conductor 11 which is a bus bar for the case of extremely high current capacities, is connected to the junction of the bridge arms, including rectifier elements 14 and 15; bus bar 12 is connected to the junction of rectifier arms 16 and 17; and bus bar 13 is connected with the junction between the rectifier arms, including rectifiers 18 and 19.

The positive ends of rectifiers 14, 16 and 18 are connected together and are brought out through a positive bus to positive terminal 20, while the negative ends of rectifiers 15, 17 and 19 are connected together and are brought out through negative terminal 21.

It will be understood that rectifiers 14 through 19 may be of any type and could, for example, represent individual groups or series and parallel connected silicon or germanium rectifier cells connected in a manner described, for example, in copending application Serial No. 628,-324, filed December 14, 1956, in the name of Isadore K. Dortort, and assigned to the assignee of the present invention, now Patent No. 2,944,028, or as shown in U.S. Patent No. 2,932,781 to Otto Jensen.

In accordance with the present invention, the current through buses 11, 12 and 13 can be balanced through a novel control circuit. The control circuit includes reactor cores 22, 23 and 24 for buses 11, 12 and 13. Each of reactor cores 22, 23 and 24 has a relatively small cross-sectional area and is preferably formed of a grain oriented steel. The buses 11, 12 and 13 can pass straight through cores 22, 23 and 24, respectively, to form reactors having a single turn and thus provide an extremely compact and inexpensive unit.

Each of cores 22, 23 and 24 is so designed as to have an extremely small "step" by virtue of a relatively small volt second rating. That is to say, the reactor cores will remain unsaturated only for a relatively short time, and will have a relatively small magnetizing current when unsaturated.

The control circuit further includes additional reactors 25, 26 and 27 for bus bars 11, 12 and 13, respectively. Reactors 25, 26 and 27 have a much smaller volt second rating than the reactors 22, 23 or 24, respectively, and are provided with air gaps 28, 29 and 30, respectively.

Further reactor means 31, 32 and 33 are then provided for the circuit to be described, which have adjustable air gaps 34, 35 and 36 which can be adjusted by maintenance workers to achieve ultimate balancing between phase currents in the manner to be described.

The adjustable air gap structure is not described and could be done in any well known manner. It will be noted that in a further embodiment of the invention resistors could be connected in series with the reactors.

An electrical circuit is then formed as a closed series circuit which includes a winding 37 of reactor 25, winding 38 of reactor 31, and control winding 39 of reactor 24. This circuit operates to supply control current for reactor 24 in accordance with the invention. A similar closed circuit is provided for reactor 22 of bus bar 11 which includes a winding 40 of reactor 26, a winding 41 of reactor 32 and a control winding 42 of reactor 22. The last control circuit operates to control reactor 23 and includes a winding 43 of reactor 27, winding 44 of reactor 33, and control winding 45 of reactor 23.

The operation of the circuit of FIGURE 1 is as follows, with particular reference to FIGURES 2, 3 and 4. Referring first to FIGURE 2, I have shown the phase currents $i_{11}$, $i_{12}$ and $i_{13}$ for the currents in conductors 11, 12 and 13, respectively, of FIGURE 1. In the absence of a reactor such as reactors 22, 23 and 24, the currents such as current $i_{11}$ will commutate with the current $i_{12}$, and conductor 11 will carry zero current for a period of somewhat less than 60°. That is to say, the current $i_{11}$ at time $t_2$ begins to drop toward zero and would normally be retained at a zero value until time $t_4$ when the current begins to rise in the negative direction.

Figure 4:
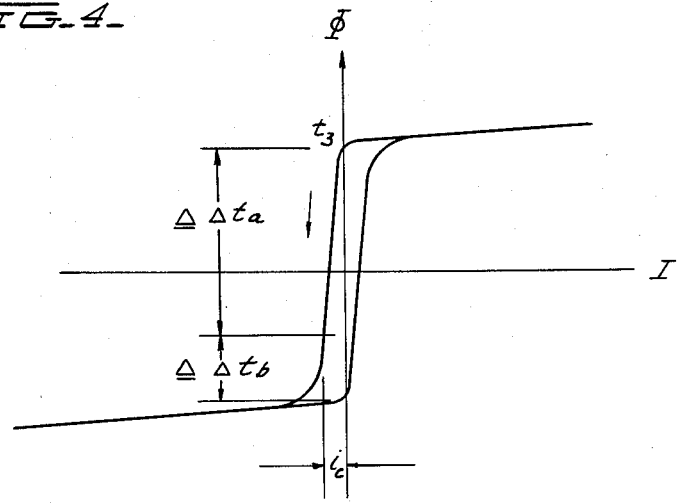
FIGURE 4 shows the magnetization curve of any of the control cores of FIGURE 1.

In accordance with the present invention, cores 22, 23 and 24 are provided which are biased by the current flowing in windings 42, 45 and 39, respectively, so that during the part of the 60° interval in which no current flows and as shown in FIGURES 4 and 5, the net ampere turns of conductor 11 passing through core 22 will be at the value $i_c$ which represents the ampere turns generated by winding 40. As soon as the sum of the ampere turns in conductor 11 and in winding 42 equals the magnetizing current of core 22, core 22 will unsaturate and go through a flux change for a time $\Delta t_a$ illustrated in FIGURES 2, 3 and 4. Note that the current scales in FIGURES 2 and 3 are not identical and that the current $i_c$ is only a small fraction of the maximum current which flows in conductor 11. This causes only a partial reversal of the flux of core 22 which stops at the point the actual current conductor 11 is zero. The current remains at zero until time $t_4$, at which time the current in conductor $i_{11}$ would normally begin to conduct in the negative direction. Since, however, before this current conduction can take place there must be additional reversal of flux of core 22, for an additional time $\Delta t_b$ there is no appreciable current conduction until after the interval $t_b$ is over and core 22 is completely saturated. This causes a phase shift in the current $i_{11}$ whereby the average current of any half wave may be decreased by increasing the interval $\Delta t_b$. The interval $\Delta t_b$ can in turn be increased merely by decreasing the bias current $i_c$.

Conversely, the average current passed can be increased by increasing the current $i_c$. The effect of core 22 can, in fact, be removed completely from the circuit by making the bias $i_c$ so large that there will be complete flux reversal of the core during the normally quiescent or nonconductive interval. The maximum effect of the core will be achieved when the bias current $i_c$ is zero so that the full flux of the core must be reversed after the quiescent 60° interval of current in conductor 11.

By using this novel phase shift at the beginning of commutation of the phase currents by a simple control of bias current $i_c$, it will be apparent that the individual bias current can be adjusted individually of one another.

Thus, the bias current $i_c$ for the phase including conductor 11 is derived from the reactor 26 which will generate a voltage on its winding 40 during the interval that current $i_{12}$ reversed from its maximum to its minimum value. However, and because of the reactor formed by core 32 and winding 41, the current $i_c$ continues to flow with a decreasing magnitude having a desired value at time $t_3$.

Accordingly, by adjusting the air gap 35 of core 32, the impedance of the circuit supplying volt seconds to winding 42 can be controlled so that the bias for core 22 may be controlled independently of cores 23 and 24. In a like manner, core 23 is controlled from the phase including conductor 13 whereby adjustment of air gap 36 of reactor core 33 will control the bias current $i_c$ for core 23.

Finally, the characteristic of core 24 is controlled from the phase including conductor 11 through adjustable reactor 31.

During these adjustments, and referring specifically to FIGURE 3, a relatively large current $i_c$ is shown in solid lines for the current supplied to winding 42 from reactor 26. In order to decrease this current as described above, the air gap 35 of core 32 is varied to change the inductance of winding 41 and thus decrease the current $i_c$ to the dotted line value of FIGURE 3 which has substantially the same shape as the higher current value but a lower magnitude.

By using control circuits of the type shown in FIGURE 1, the control current $i_c$ will be caused to vary directly with the main phase current.

Furthermore, by designing reactors 25, 26 and 27 so that they have the same volt second rating as reactors 31, 32 and 33, the non-linearities of the cores are compensated by one another so that the change in control current will be almost exactly proportional to the change in phase current.

Referring to FIGURE 5 which schematically illustrates this operation, phase current $i_{12}$ is plotted against time as a vertical axis. The effect of current $i_{12}$ on reactor 26 is schematically illustrated by the hysteresis loop 50 of reactor 26 which shows the flux of the reactor in the vertical axis and the magnetizing current of the reactor on a horizontal axis. The excursion of flux in reactor 50 is related to the volt second value 51 shown adjacent the hysteresis loop 50 for reactor core 26 where value 51 represents an envelope of the volt seconds change in core 32 as a function of time plotted on a horizontal axis. The volt seconds generated in reactor 26 is equal to the volt seconds absorbed by reactor 32, disregarding the small amount of volt seconds generated in winding 42 during flux reversal of core 22, as pointed out above, so that the voltage applied to winding 41 will be related to the hysteresis loop 52 of reactor core 32 shown at the right-hand side of FIGURE 5 which illustrates the flux of reactor core 32 on a vertical axis and the current through winding 41 on a horizontal axis.

The control current can now be derived from hysteresis loop 52 and is shown at the lower right-hand corner of FIGURE 5 as control current $i_c$. Since the reactors 32 and 26 have identical volt second ratings, their non-linearities are cancelled around the circuit as illustrated in FIGURE 5 so that the wave shape of the control current $i_c$ is directly related to the wave shape of the phase current $i_{12}$. Furthermore, there is a direct relationship between the magnitude of the phase current $i_{12}$ and the magnitude of control current $i_c$.

In order to reduce the current $i_c$, the air gap 35 of reactor core 32 is increased so that the hysteresis loop of core 32 becomes that shown in dotted lines 53. As a result of this change, the control current $i_c$ will assume the dotted value shown which is reduced in magnitude although is still substantially the same in wave shape as is the current $i_{12}$.

Accordingly, with the novel circuit there is a direct relationship between phase current and control current so that there is automatically controlled regulation of the phase current of all the phases so that a constant relationship between them will remain. This means that a constant balance will be achieved regardless of the magnitude of phase current.

Although I have illustrated the control elements of the various circuits as only reactors 31, 32 and 33, adjustable resistors can be connected in series with these reactors. With the adjustable resistor, the wave shape changes as shown in FIGURE 6. However, the control current and load current are still in constant relation with one another.

When a respective resistor is connected in series with the reactors 31, 32 and 33, the magnitude of current $i_c$ at time $t_3$ is still a function of the air gap of the respective reactor and is shown by curves 54 of FIGURE 6. Where control is achieved by such variable resistors, the bias for phase 11 should come from phase 13 rather than phase 12 since the resistor control will be strongest at time $t_5$ rather than at time $t_4$.

It will be noted that while I have illustrated the invention as having the control reactors and their control elements in the secondary side of the rectifier, they could be applied in the primary side as well. Furthermore, the invention is not necessarily limited to balancing between rectifier phases and can be applied to any application dealing with unbalanced currents in adjacent conductors of a multi-phase system so long as there is a time interval of no current flow for the phases.

In the foregoing the invention has been described solely in connection with specific illustrative embodiments thereof. Since many variations and modifications of the invention will now be obvious to those skilled in the art, it is preferred to be bound not by the specific disclosures herein contained but only by the appended claims.

I claim:

1. A phase current balancing circuit for multi-phase systems; said phase current balancing circuit including respective reactor cores for each of said phases; each of said reactor cores having a main winding connected in series with its said respective phase; each of said reactor cores having a biasing winding and an independent source of biasing current connected to each said biasing winding; said source of biasing current for each of said phases being connected to the other of said phases which conducts current before said phase associated with said source of biasing current; said source of biasing current being controlled to reverse a controlled portion of flux of its said respective magnetic core prior to zero passage of current through the said phase associated with said source of biasing current; the remainder of said flux of said magnetic core being reversed upon change of current in said phase from zero current to provide a controlled time delay in the beginning of current flow from a zero value; and means for adjusting the magnitude of the biasing current for each phase independently of one another to control the amount of flux reversed in each respective core prior to current zero in each respective phase; said magnetic cores having a relatively low magnetizing current.

2. A phase current balancing circuit for multi-phase systems; said phase current balancing circuit including respective reactor cores for each of said phases; each of said reactor cores having a main winding connected in series with its said respective phase; each of said reactor cores having a biasing winding and an independent source of biasing current connected to each said biasing winding; said source of biasing current for each of said phases being connected to the other of said phases which conducts current before said phase associated with said source of biasing current; said source of biasing current being controlled to reverse a controlled portion of flux of its said respective magnetic core prior to zero passage of current through the said phase associated with said source of biasing current; the remainder of said flux of said magnetic core being reversed upon change of current in said phase from zero current to provide a controlled time delay in the beginning of current flow from a zero value; and means for adjusting the magnitude of the biasing current for each phase independently of one another to control the amount of flux reversed in each respective core prior to current zero in each respective phase; said magnetic cores being of grain oriented steel.

3. A phase current balancing circuit for multi-phase systems; said phase current balancing circuit including respective reactor cores for each of said phases; each of said reactor cores having a main winding connected in series with its said respective phase; each of said reactor cores having a biasing winding and an independent source of biasing current connected to each said biasing winding; said source of biasing current for each of said phases being connected to the other of said phases which conducts current before said phase associated with said source of biasing current; said source of biasing current being controlled to reverse a controlled portion of flux of its said respective magnetic core prior to zero passage of current through the said phase associated with said source of biasing current; the remainder of said flux of said magnetic core being reversed upon change of current in said phase from zero current to provide a controlled time delay in the beginning of current flow from a zero value; and means for adjusting the magnitude of the biasing current for each phase independently of one another to control the amount of flux reversed in each respective core prior to current zero in each respective phase; said main winding for each of said cores comprising a straight thru portion of a conductor of the respective phase.

4. A phase current balancing circuit for multi-phase systems; said phase current balancing circuit including respective reactor cores for each of said phases; each of said reactor cores having a main winding connected in series with its said respective phase; each of said reactor cores having a biasing winding and an independent source of biasing current connected to each said biasing winding; said source of biasing current for each of said phases being connected to the other of said phases which conducts current before said phase associated with said source of biasing current; said source of biasing current being controlled to reverse a controlled portion of flux of its said respective magnetic core prior to zero passage of current through the said phase associated with said source of biasing current; the remainder of said flux of said magnetic core being reversed upon change of current in said phase from zero current to provide a controlled time delay in the beginning of current flow from a zero value; and means for adjusting the magnitude of the biasing current for each phase independently of one another to control the amount of flux reversed in each respective core prior to current zero in each respective phase; said magnetic cores having a relatively low magnetizing current; said sources of biasing current for each of said phases deriving energy from an adjacent phase.

5. A phase current balancing circuit for multi-phase systems; said phase current balancing circuit including respective reactor cores for each of said phases; each of said reactor cores having a main winding connected in series with its said respective phase; each of said reactor cores having a biasing winding and an independent source of biasing current connected to each said biasing winding; said source of biasing current for each of said phases being connected to the other of said phases which conducts current before said phase associated with said source of biasing current; said source of biasing current being controlled to reverse a controlled portion of flux of its said respective magnetic core prior to zero passage of current through the said phase associated with said source of biasing current; the remainder of said flux of said magnetic core being reversed upon change of current in said phase from zero current to provide a controlled time delay in the beginning of current flow from a zero value; and means for adjusting the magnitude of the biasing current for each phase independently of one another to control the amount of flux reversed in each respective core prior to current zero in each respective phase; said magnetic cores having a relatively low magnetizing current; said sources of biasing current being electrically connected to their said respective biasing windings in series with a respective reactor having an adjustable air gap therein.

6. A phase current balancing circuit for multi-phase systems; said phase current balancing circuit including respective reactor cores for each of said phases; each of said reactor cores having a main winding connected in series with its said respective phase; each of said reactor cores having a biasing winding and an independent source of biasing current connected to each said biasing winding; said source of biasing current for each of said phases being connected to the other of said phases which conducts current before said phase associated with said source of biasing current; said source of biasing current being controlled to reverse a controlled portion of flux of its said respective magnetic core prior to zero passage of current through the said phase associated with said source of biasing current; the remainder of said flux of said magnetic core being reversed upon change of current in said phase from zero current to provide a controlled time delay in the beginning of current flow from a zero value; and means for adjusting the magnitude of the biasing current for each phase independently of one another to control the amount of flux reversed in each respective core prior to current zero in each respective phase; said magnetic cores having a relatively low magnetizing current; said sources of biasing current being electrically connected to their said respective biasing windings in series with a respective reactor having an adjustable air gap therein; said sources of biasing current including magnetic reactors having a volt second rating equal to the volt second rating of their said respective reactors.

References Cited by the Examiner
UNITED STATES PATENTS
2,289,090  7/42  Bedford _____ 321—26

LLOYD McCOLLUM, *Primary Examiner.*
ORIS L. RADER, *Examiner.*